United States Patent Office 2,797,651
Patented July 2, 1957

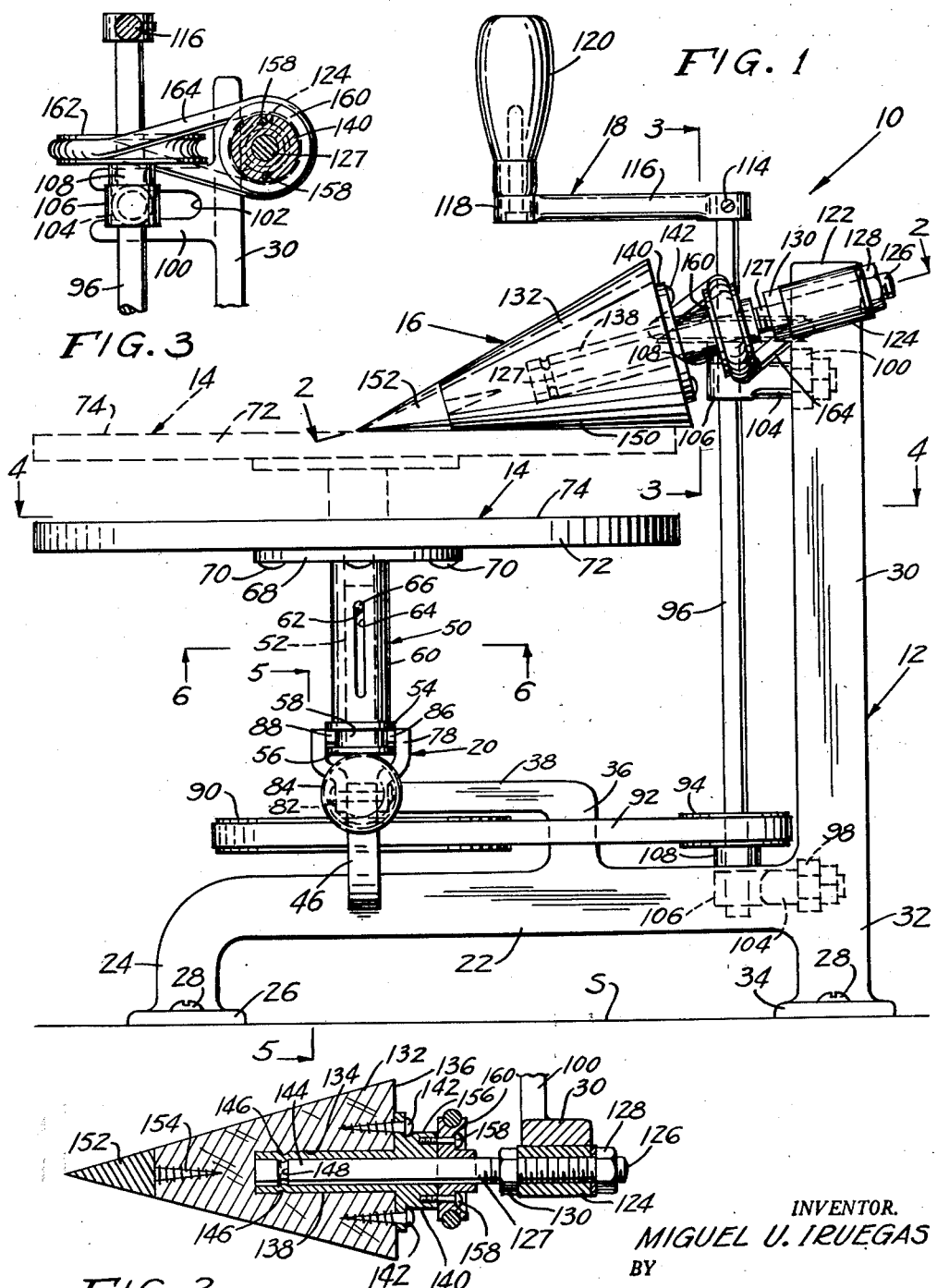

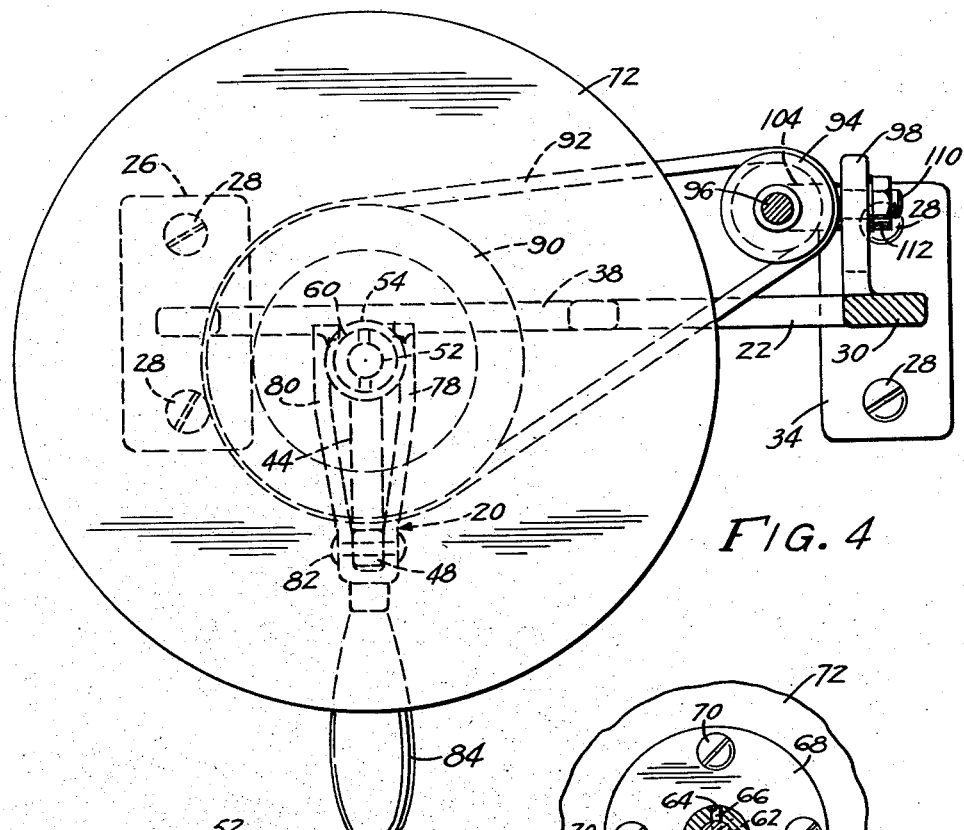
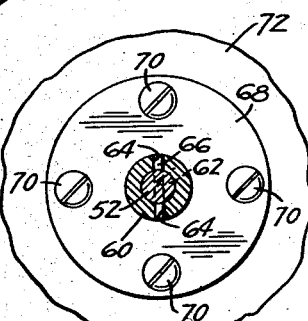
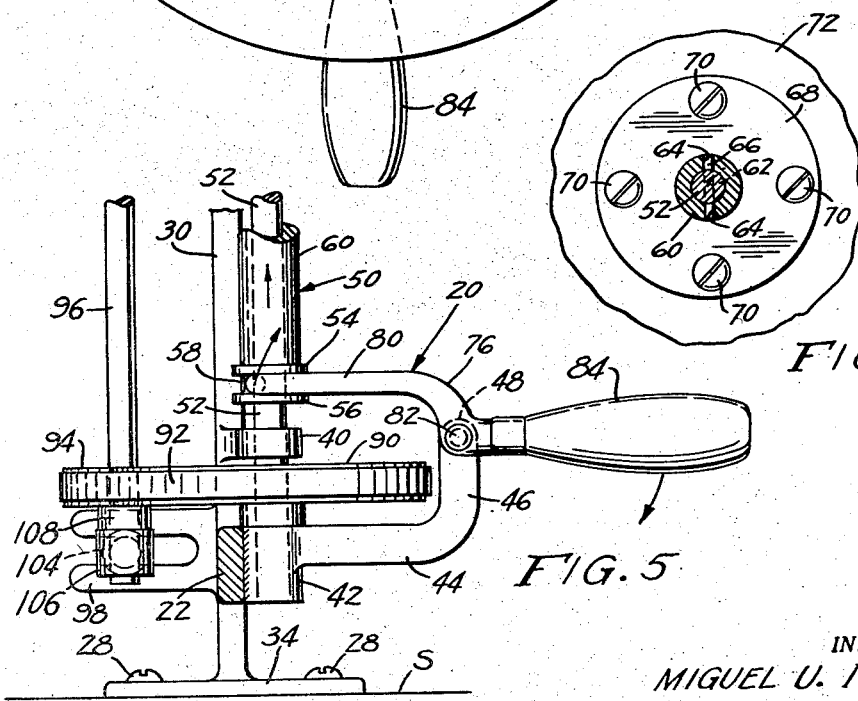

2,797,651

MECHANICAL PASTRY FORMING APPARATUS

Miguel U. Iruegas, San Antonio, Tex.

Application January 27, 1956, Serial No. 561,721

2 Claims. (Cl. 107—12)

This invention relates generally to pastry forming apparatus and is more particularly concerned with novel mechanical dough-kneading apparatus for forming dough material used in preparing tortillas, pizza, and the like.

The primary object of the invention is to provide a novel mechanical dough-kneading apparatus including a synchronously driven dough supporting rotary turntable and a conically shaped rolling pin member in overlying relationship relative to the turntable, said apparatus including means for adjusting the relative vertical distance between the turntable and rolling pin member, and means for reversing the rotation of the turntable and rolling pin member in their direction of rotation for kneading dough material disposed therebetween.

A further object of the invention in conformance with that set forth above is to provide novel mechanical dough-kneading apparatus of the character set forth which is readily assembled, easily used and maintained, and highly satisfactory and serviceable for the purpose intended.

These together with outer objects and advantages which will become subsequently apparent reside in the details of construction and operation as will be more fully hereinafter described and claimed, reference being had to the accompanying drawings forming a part hereof, wherein like numerals refer to like parts throughout, and in which:

Figure 1 is a side elevational view of the novel dough-kneading apparatus;

Figure 2 is a sectional view taken substantially on line 2—2 of Figure 1;

Figure 3 is a fragmentary sectional view taken substantially on line 3—3 of Figure 1;

Figure 4 is a sectional view taken substantially on line 4—4 of Figure 1;

Figure 5 is a fragmentary sectional view taken substantially on line 5—5 of Figure 1; and Figure 6 is a fragmentary sectional view taken substantially on line 6—6 of Figure 1.

Referring to the drawings, the novel mechanical dough-kneading apparatus is indicated generally at 10 and includes a support member or frame 12, the rotary turntable assembly 14, the rolling pin assembly 16, the power or drive assembly 18 and a turntable lift or vertical adjusting assembly 20.

The support member or frame includes a horizontal support portion 22 which includes a depending leg 24 at one end and a suitable horizontally disposed mounting flange 26 suitably apertured for receiving fastening elements 28 therethrough for securing one end of the support frame on a support surface S. The support portion 22 is integrally formed with a vertical support member 30 at an intermediate portion thereof, see Figure 1, the vertical support member 30 including a lower leg portion 32 terminating in a horizontal mounting flange 34 suitably apertured for receiving fastening elements 28 therethrough, thus mounting the other end of the support frame on the support surface S.

The horizontal support portion 22 has extending upwardly from an intermediate portion thereof an extension portion 36 terminating in an angulated portion 38 which overlies portion 22 and which terminates in a vertically apertured journal support portion 40. Extending laterally and integrally from an intermediate portion of the support portion 22 in vertical alignment with the journal portion 40 is a lower journal socket 42 which continues as a laterally extending support bracket 44 terminating in an upwardly extending portion 46, the upper end portion 48 of portion 46 being transversely apertured to define a horizontal pivot axis for a purpose to subsequently become apparent.

Rotatably supported in the socket portion 42 and journal portion 40 is an extensible shaft assembly indicated generally at 50, said shaft assembly including a central support shaft member 52 having its lower end rotatably received in the aforementioned members 40 and 42. Circumposed about a lower intermediate portion of the shaft 52 is an annular collar element comprised of a pair of spaced flange elements 54 and 56 defining a horizontally disposed annular groove 58. A sleeve member 60 is slidably disposed on the shaft 52 having its lower end in engagement with an upper surface portion of the flange 54, and the shaft 52 has extending therethrough a transverse aperture portion 62 which is in alignment with a pair of diametrically opposed vertically extending slot portions 64 extending through the sleeve 60, and extending through the aperture 62 in the slots 64, see Figures 1 and 6, is a diametrical lock pin 66 which permits reciprocable movement between the shaft 52 and the sleeve 60 and locks the same for simultaneous rotary movement together when the shaft 52 is rotated in a manner to be subsequently described.

As seen in Figures 1 and 6, the sleeve 60 includes at its upper end an integral annular mounting plate 68 which is suitably apertured for receiving fastening elements 70, such as wood screws, therethrough, which secure to the mounting flange a substantially horizontally disposed disc-like turntable member 72 which has an upper, uninterrupted planar surface 74 for receiving thereon the tortilla or pizza dough, for example. As seen in Figure 1, the turntable 72 may be adjusted vertically by virtue of the extensible driven shaft 50, whereby the planar upper surface may be moved toward and away from the rolling pin assembly 16.

The portion 46 of the support bracket 44 has mounted on its upper apertured end a lower bifurcated intermediate portion 76 constituted by a pair of spaced leg members 78 and 80 which are disposed on opposite sides of said portion 46, and a transverse pivot bolt 82 extends through aligned apertures in the legs 78 and 80 and said portion 46, providing a horizontal pivot axis for the adjusting handle 84. The legs 78 and 80 extending toward the extensible driven shaft 50 and having inwardly turned, lateral end portions 86 and 88 respectively, are disposed on diametrically opposite sides of the extensible shaft 50 within the groove 58 defined by the flange portions 54 and 56 on the shaft 52. Thus, pivotal movement of the handle 84 in the direction indicated by the direction arrow in Figure 5 results in upward movement of the reciprocable sleeve 60, thus affording the adjustment illustrated by the dotted lines in Figure 1.

Secured to a lower intermediate portion of the shaft 52 in any suitable manner for rotation with said shaft is a driven pulley member 90 of any suitable character, which has journaled thereon a drive belt 92 which is journaled about the driving pulley 94 in horizontal planar alignment with the pulley 90, said drive pulley 90 being fixedly secured to an intermediate portion of a vertically disposed drive shaft 96 which is disposed substantially parallel to the vertical support portion 30 of the support frame in a manner to subsequently be described.

The support portion 30 has extending therefrom in vertically spaced relationship a pair of support bracket elements 98 and 100, said elements 98 and 100 including laterally extending open slot portions 102 for receiving therein the threaded end portions for mounting bolt assemblies 104 which have a vertically disposed terminal journal portion 106 rotatably receiving the drive shaft 96 therethrough, said drive shaft 96 having circumposed thereon in vertically spaced relationship annular abutment or flange elements 108 resting upon portions 106 for fixing the position of said drive shaft 96. The threaded end 110 of the mounting bolt 104 is formed on a reduced diameter portion of said mounting bolt providing an abutment shoulder interengageable with the adjacent side portion of the elements 98 and 100, and a suitable nut element 112, see Figure 4, is secured on said threaded end 110 in engagement with the opposite side of the elements 98 and 100.

Suitably secured on the upper end of the drive shaft 96 by means of a transverse lock screw 114 is a lateral handle portion 116 having suitably secured on the end 118 an upwardly extending rotatable handle member 120. Thus, rotation of the handle member 116 results in rotation of the drive shaft 96, pulley 94 thereon, and through the drive belt 92 rotary movement of the pulley 90 and the extensible driven shaft 50. It is believed readily apparent that the turntable may be rotated in a clockwise or counterclockwise direction. Such rotation will afford a kneading action to plastic dough material placed on the turntable. Although it has been illustrated that the drive shaft is rotated manually, power means may be readily substituted therefor.

The support portion 30 has extending from its upper end portion 122 extending laterally from the side opposite that from which the element 100 extends an angular tubular mounting sleeve element 124 which receives the threaded end 126 of a rolling pin support shaft 127 therethrough, see Figure 2, the same being retained in position on said sleeve 124 by means of oppositely disposed nut elements 128 and 130. Shaft 127 has rotatably fixed thereon the conical rolling pin member 132 which includes the blind bore portion 134 opening into its planar base 136, said blind bore 134 receiving therein a mounting sleeve element 138 which has an annular mounting flange portion 140 suitably apertured for receiving fastening elements, such as wood screws 142 transversely therethrough and extending into the conical rolling pin 132, said sleeve 138 rotatably receiving the end portion 144 therein and being secured thereto by means of upset detent portions 146 extending toward the inner periphery thereof and being rotatably received in an annular groove 148 extending around the outer periphery of the shaft 127. The outer periphery of the conical rolling pin member 132 has a lower peripheral edge portion 150 disposed in substantially horizontal and parallel alignment to the upper surface portion 74 of the rotary turntable 72, said conical element, if desirable, including a replaceable conical end point 152 being fixedly secured by means of a suitable integral screw end 154 of the rolling pin member. The rolling pin member together with the point 152 extends from the center of the turntable 72 radially in overlying relationship toward the outer edge of said turntable.

The mounting flange 140 of the sleeve 138 includes a reduced diameter laterally extending mounting portion 156, see Figure 2, which is suitably apertured for receiving therein fastening screw elements 158 which extend through a drive pulley element 160 circumposed on an intermediate portion of the shaft 127 and rotatable thereon, said pulley element 160 constituting a second driven pulley. As seen in Figure 3, the drive shaft 96 has secured on an upper intermediate portion thereof a driving pulley 162 which has journaled thereover a twisted drive belt 164 journaled about the pulley 160. Thus, rotation of the drive shaft 96 not only rotates the lower pulley 90 for rotating the turntable, but also simultaneously rotates the pulley 60 and the rolling pin member 132. The twisted belt affords a rotary movement whereby the upper surface 74 of the turntable and the peripheral parallel edge of the rolling pin rotate in the same direction, whether the drive shaft is being rotated clockwise or counterclockwise, thus affording the previously mentioned kneading action for dough material placed on the turntable.

Although there has been disclosed drive belts and pulleys for obtaining the aforementioned simultaneous rotary action, any suitable mechanical expedient may be substituted therefor.

Various positional directional terms, such as "upper," "side," et cetera, utilized herein have only relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A machine for shaping plastic dough material for tortillas, pizza, and the like, comprising a support member including horizontal and vertical support portions, a vertical drive shaft rotatably carried on the vertical support portion, a driven shaft rotatably supported from the horizontal support portion, a turntable secured to an upper end portion of the driven shaft for rotation therewith, the turntable including an upper planar surface portion for receiving plastic dough material thereon, a support shaft supported in angular relationship on an upper end portion of the vertical support portion, a conical roling pin member rotatably journaled on the support shaft and including a peripheral longitudinal surface portion disposed substantially horizontal in overlying relationship to the planar surface portion of a turntable, power transmitting means synchronously connecting the driven shaft and rolling pin member to the drive shaft for simultaneously driving the rolling pin member and driven shaft whereby the parallel overlying surface portions of the turntable and rolling pin member rotate in a common direction, reversible rotating means operatively connected to the drive shaft for simultaneously rotating the turntable and rolling pin member in alternate directions and kneading dough material disposed therebetween, and means on the support member for providing a vertical adjustment between the rolling pin member and the turntable, said rotating means comprising a manually operable horizontally rotatable handle assembly secured to an upper end portion of the driving shaft above the rolling pin member.

2. A machine for shaping plastic dough material for tortillas, pizzas, and the like, comprising a support member including horizontal and vertical support portions, a vertical drive shaft rotatably carried on the vertical support portion, a driven shaft rotatably supported from the horizontal support portion, a turntable secured to an upper end portion of the driven shaft for rotation therewith, the turntable including an upper planar surface portion for receiving plastic dough material thereon, a support shaft supported in angular relationship on an upper end portion of the vertical support portion, a conical rolling pin member rotatably journalled on the support shaft and including a peripheral longitudinal surface portion disposed substantially horizontal in overlying relationship to the planar surface portion of a turntable, power transmitting means synchronously connecting the driven shaft and rolling pin member to the drive shaft for simultaneously driving the rolling pin member and driven shaft whereby the parallel overlying surface portions of the turntable and rolling pin member rotate in a common direction, reversible rotating means operatively connected to the drive shaft for simultaneously rotating the turntable and rolling pin member in alternate directions and kneading dough material disposed therebetween, and means on the support member for providing a vertical adjustment between the rolling pin member and the turntable, said turntable comprising a circular plate having an uninterrupted upper surface portion, the conical rolling pin member extending radially from the center of the upper surface portion of the turntable, said power transmitting means comprising upper and lower longitudinally spaced drive pulleys on the drive shaft, a driven pulley on the driven and support shafts, endless drive belts entrained over the upper and lower drive pulleys and the respective driven pulleys on the support and driven shafts, and means on the vertical support portion adjustably supporting the drive shaft for lateral movement toward and away from the vertical support portion and the driven pulleys for adjusting the tension on the endless drive belts.

References Cited in the file of this patent

UNITED STATES PATENTS

| | | |
|---|---|---|
| 1,035,065 | Winder | Aug. 6, 1912 |
| 1,628,828 | Denmead | May 17, 1927 |
| 1,977,309 | Jackson | Oct. 16, 1934 |